(No Model.)

P. DIEHL.

COMMUTATOR FOR DYNAMO ELECTRIC MACHINES AND ELECTRIC MOTORS.

No. 351,167. Patented Oct. 19, 1886.

WITNESSES:
Alphonse Walter.
Thomas Kraemer.

INVENTOR
Philip Diehl

UNITED STATES PATENT OFFICE.

PHILIP DIEHL, OF ELIZABETH, NEW JERSEY.

COMMUTATOR FOR DYNAMO-ELECTRIC MACHINES AND ELECTRIC MOTORS.

SPECIFICATION forming part of Letters Patent No. 351,167, dated October 19, 1886.

Application filed July 9, 1886. Serial No. 207,540. (No model.)

*To all whom it may concern:*

Be it known that I, PHILIP DIEHL, a citizen of the United States, residing at Elizabeth, in the county of Union and State of New Jersey, have invented certain new and useful Improvements in Commutators for Electric Motors and Dynamo-Machines, of which the following is a specification, reference being had to the accompanying drawings.

The object of my invention is to provide a cheap and durable commutator for electric motors and dynamo-electric machines; and I attain this object by partly embedding the metallic commutator-sections in a non-conducting plastic material, so that when the said plastic material hardens the said sections will be securely held in place without special fastening devices.

Figure 1:
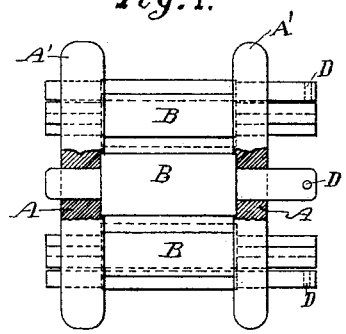
Figure 2:
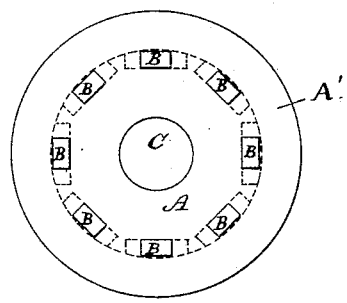
Figure 3:
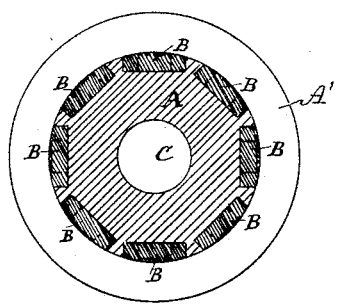
Figure 4:
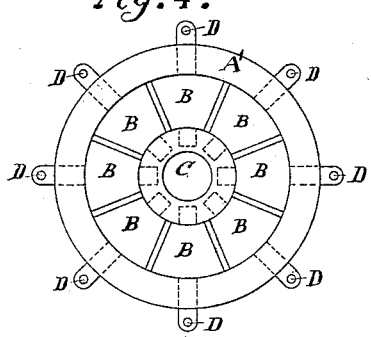
Figure 5:
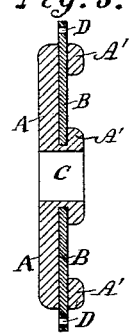

In the drawings, Figure 1 is a front view, partly broken out, of a commutator embodying my invention. Figs. 2 and 3 are end and sectional views, respectively, of the same. Fig. 4 is a front view of a disk-shaped commutator embodying my invention, and Fig. 5 is a section of the same.

The body portion A of my commutator consists of a suitable non-conducting plastic material—such as gutta percha, sawdust mixed with glue, plaster-of-paris, or Portland cement—and the metallic commutator-sections B are embedded in the said plastic material, so that when the latter has become hard they will be securely held in place without the use of any special fastening devices. To adapt the sections B for this purpose they are preferably formed with comparatively large central portions and smaller end portions, so that they will have shoulders which, being embedded in the body portion of the commutator, will prevent endwise movement of the said sections. The smaller end portions of the metallic sections will preferably be overlapped by rings or flanges A' of the non-conducting hardened plastic body A, thus securely holding the sections B in place.

The body A is provided with a central opening, C, for the reception of the shaft, on which the commutator will be placed, and each of the sections B has a hole, D, for convenience in attaching the terminals of the armature-coils.

The section B may be stamped out of sheet metal, or may be of cast metal.

In making the commutators the metallic sections B are first placed in proper position in a mold, and the non-conducting material in a plastic condition is then pressed in the mold, partly surrounding the metallic sections, so that they become partly embedded therein, and when the body of the commutator becomes hardened the said sections are firmly held in place.

I am aware that it is not new to form the body of a commutator of non-conducting plastic material, and I do not therefore claim the same, broadly; but, so far as my knowledge extends, I am the first to make a commutator the body of which is of non-conducting plastic material, in such a manner that the metallic commutator-sections will be embedded in and held in place by the hardened plastic material, thereby dispensing with special fastening devices, and greatly cheapening the construction of this class of devices.

Having thus described my invention, what I claim is—

1. A commutator for an electric motor or a dynamo-electric machine, consisting of a body of hardened non-conducting plastic material and metallic sections partly embedded in and held in place by the said material, whereby the said sections are secured in working position without the use of special fastening devices, substantially as set forth.

2. A commutator consisting of metallic sections B, having central portions which are larger than their ends, and a body portion of hardened non-conducting plastic material, in which the said sections B are partly embedded, and by which they are firmly held in place, substantially as set forth.

In testimony whereof I affix my signature in presence of two witnesses.

PHILIP DIEHL.

Witnesses:
  JAS. T. SHAW,
  L. L. BURRITT.